United States Patent
Torkkeli et al.

(10) Patent No.: US 10,969,575 B2
(45) Date of Patent: Apr. 6, 2021

(54) MEMS REFLECTOR WITH CENTER SUPPORT

(71) Applicant: MURATA MANUFACTURING CO., LTD., Nagaokakyo (JP)

(72) Inventors: Altti Torkkeli, Tuusula (FI); Matti Liukku, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 162 days.

(21) Appl. No.: 16/187,064

(22) Filed: Nov. 12, 2018

(65) Prior Publication Data

US 2019/0146211 A1    May 16, 2019

(30) Foreign Application Priority Data

Nov. 13, 2017 (FI) .................................... 20176014

(51) Int. Cl.
  *G02B 26/08* (2006.01)
  *G02B 26/10* (2006.01)

(52) U.S. Cl.
  CPC ....... *G02B 26/0858* (2013.01); *G02B 26/105* (2013.01)

(58) Field of Classification Search
  None
  See application file for complete search history.

(56) References Cited

U.S. PATENT DOCUMENTS

| | | |
|---|---|---|
| 7,483,200 B1 | 1/2009 | Pan |
| 2002/0146200 A1 | 10/2002 | Kudrle et al. |
| 2003/0202264 A1 | 10/2003 | Weber et al. |
| 2004/0240033 A1 | 12/2004 | Pan et al. |
| 2005/0018322 A1 | 1/2005 | Ben-Gad et al. |
| 2005/0145053 A1* | 7/2005 | Bai ............... B81B 3/0062 74/469 |

(Continued)

FOREIGN PATENT DOCUMENTS

| | | |
|---|---|---|
| CN | 107305288 A | 10/2017 |
| DE | 102005034927 A1 | 3/2006 |

(Continued)

OTHER PUBLICATIONS

Second Office Action dated Jun. 22, 2020 corresponding to Japanese Patent Application No. 2018-206984.

(Continued)

*Primary Examiner* — Jennifer D. Carruth
(74) *Attorney, Agent, or Firm* — Squire Patton Boggs (US) LLP

(57) ABSTRACT

A scanning microelectromechanical reflector system comprising a reflector with a reflector body, a first cavity vertically aligned with the reflector body above the device plane and a second cavity vertically aligned with the reflector body below the device plane. The reflector also comprises a central attachment point located within a central opening in the reflector body. One or more flexures extend from the sidewalls of the central opening to the central attachment point. The flexures allow the central attachment point to remain stationary in the device plane when actuator units tilt the reflector body out of the device plane. The reflector system comprises a central support structure which extends through the cavity to the central attachment point of the reflector.

14 Claims, 7 Drawing Sheets

(56) References Cited

U.S. PATENT DOCUMENTS

| | | |
|---|---|---|
| 2006/0018049 A1 | 1/2006 | Mizuno |
| 2007/0008401 A1 | 1/2007 | Cannon et al. |
| 2007/0139752 A1 | 6/2007 | Bernstein et al. |
| 2009/0195854 A1 | 8/2009 | Huang |
| 2010/0061073 A1 | 3/2010 | Oldsen et al. |
| 2011/0228440 A1 | 9/2011 | Kato et al. |
| 2012/0147445 A1* | 6/2012 | Mizoguchi .............. B81B 3/0062 359/212.1 |
| 2012/0320379 A1 | 12/2012 | Hofmann et al. |
| 2014/0177020 A1* | 6/2014 | Hino ....................... G02B 26/10 359/200.1 |
| 2015/0253567 A1 | 9/2015 | Graves |
| 2015/0286048 A1 | 10/2015 | Chen et al. |
| 2017/0297898 A1 | 10/2017 | Torkkeli et al. |
| 2017/0351088 A1* | 12/2017 | Aoyagi .................. H04N 1/113 |
| 2018/0059408 A1* | 3/2018 | Murayama ............ G01S 7/4817 |

FOREIGN PATENT DOCUMENTS

| | | | |
|---|---|---|---|
| DE | 60306254 | T2 | 4/2007 |
| DE | 102007002725 | A1 | 7/2008 |
| EP | 1793260 | A1 | 6/2007 |
| EP | 1835324 | A1 | 9/2007 |
| EP | 2447755 | A1 | 5/2012 |
| EP | 3287830 | A1 | 2/2018 |
| JP | 2008026649 | A | 6/2008 |
| JP | 2009520220 | A | 5/2009 |
| JP | 2011133745 | A | 7/2011 |
| JP | 2011191593 | A | 9/2011 |
| JP | 2016-009050 | A | 1/2016 |
| JP | 2017-097193 | A | 6/2017 |
| JP | 2017-134391 | A | 8/2017 |
| JP | 2017-173803 | A | 9/2017 |
| JP | 2017194685 | A | 10/2017 |
| WO | 2008087022 | A1 | 7/2008 |

OTHER PUBLICATIONS

Finnish Search Report dated Jun. 8, 2018 corresponding to Finnish Patent Application No. 20176014.

* cited by examiner

MEMS REFLECTOR WITH CENTER SUPPORT

FIELD OF THE DISCLOSURE

This disclosure relates to microelectromechanically actuated scanning reflectors, and more particularly to reducing the risk of undesired oscillation modes in such reflectors.

BACKGROUND OF THE DISCLOSURE

Scanning microelectromechanical (MEMS) reflectors can be used in imaging devices such as light-detecting and ranging sensors (LIDARs). A scanning MEMS reflector may contain at least one moving reflector which can reflect light beams from a laser emitter towards the surrounding environment. Additional fixed reflectors may be included in the light path between the moving reflector and the environment. Returning light beams can be reflected inward towards a photodetector by the same fixed reflectors and moving reflector which reflected the outgoing beam.

In order to emit and pick up light beams over a broad imaging area (the field of view), a MEMS reflector must be tilted back and forth. The imaging area of a MEMS reflector is in part determined by how much the moving reflector can be tilted. In simple implementations, MEMS reflectors can be configured to tilt about only one axis. The resulting oscillation mode, where the mirror scans a planar angle centred on the tilting axis, may be called 1-axis tilting oscillation.

In more complex implementations the reflector may perform scanning motion across a solid angle. FIG. 1a illustrates a configuration where the reflector 11 is attached to a rotatable gimbal frame 13. The gimbal frame 13 may rotate in relation to the fixed frame 12 about the axis between its fixing points 121 and 122. The reflector 11 may in turn rotate in relation to the gimbal frame 13 about the axis between its fixing points 131 and 132. The resulting oscillation mode may be called 2-axis tilting oscillation.

FIG. 1b illustrates an alternative configuration for scanning a solid angle, where the reflector 11 is suspended from the fixed frame 12 by bendable and/or partly mobile suspenders 151-154. These suspenders may be coupled to force actuators. These actuators can create quasi-rotational reflector movement by lifting and lowering the fixing points 1511-1514 on the edge of the reflector in a suitably synchronized and coordinated manner. The resulting oscillation mode may be called wobbling oscillation.

In each of these operational oscillation modes, the tilt amplitude can typically be maximized by driving the actuating force at a frequency which corresponds to the resonance frequency of the oscillation. In LIDAR applications, this frequency may be in the range 0.5 kHz-5 kHz. The actuators which set the reflector in oscillation may be piezoelectric or capacitive actuators.

The operational oscillation modes described above are desired resonance modes. However, the components of a microelectromechanical reflector system can also exhibit undesired resonance oscillation. Such resonance oscillation may be called parasitic oscillation, and it may arise from external shocks or vibrations which the entire MEMS reflector system is subjected to in usage. It is preferable to design MEMS reflectors in such a way that the desired operational oscillation modes have a lower resonance frequency than any parasitic oscillation mode.

Prior art document US2012320379 discloses a scanning MEMS reflector system for scanning a solid angle. Prior art document US20100061073 discloses a scanning MEMS reflector system for scanning a planar angle.

One parasitic oscillation mode may be especially troublesome in MEMS reflector systems due to its low resonance frequency. This is a parasitic mode where the entire reflector 11 moves in translational motion above and then below the xy-plane defined in FIG. 1b. This parasitic oscillation mode may be called the piston mode. It involves the simultaneous translation of the entire reflector along the z-axis which is orthogonal to the xy-plane. If the reflector is thin, the amplitude of this translational oscillation may be slightly larger at the center of the reflector than at the edges.

Flexible or partly mobile suspenders attached to the edges of the reflector, such as suspenders 151-154, can typically not be configured to shift the piston mode to high frequencies without severely reducing the tilt amplitude that they are able to generate.

BRIEF DESCRIPTION OF THE DISCLOSURE

An object of the present disclosure is to provide an apparatus for overcoming the above problems.

The objects of the disclosure are achieved by an arrangement which is characterized by what is stated in the independent claims. The preferred embodiments of the disclosure are disclosed in the dependent claims.

The disclosure is based on the idea of fixing the center of the reflector to a central support structure which is stiff in the vertical direction perpendicular to the device plane. This central support structure may extend from an adjacent packaging component to the reflector.

An advantage of this arrangement of the disclosure is that the resonance frequencies of all parasitic oscillation modes, including the piston mode, become much larger than the resonance frequencies of the operational oscillation modes. The vibration amplitude in the piston mode is also reduced.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

This disclosure describes a scanning microelectromechanical reflector system comprising a device wafer which defines a device plane. The device wafer comprises a reflector which comprises a reflector body, and the device wafer further comprises a fixed frame which surrounds the reflector body, and one or more actuator units configured to tilt the reflector body out of the device plane. The reflector system also comprises a first cavity vertically aligned with the reflector body above the device plane, and a second cavity vertically aligned with the reflector body below the device plane. The reflector system also comprises a first packaging component on top of the device wafer. The first packaging component comprises a first cavity wall which delimits the first cavity in the vertical direction. The reflector system also comprises a second packaging component below the device wafer, wherein the second packaging component comprises a second cavity wall which delimits the second cavity in the vertical direction.

The reflector also comprises a central attachment point. The central attachment point is located within a central opening in the reflector body. One or more flexures extend from the sidewalls of the central opening to the central attachment point. The flexures are configured to allow the central attachment point to remain stationary in the device plane when the one or more actuator units tilt the reflector body out of the device plane. At least one of the first and second cavity walls further comprises a central support structure which extends through the corresponding cavity from the cavity wall to the central attachment point of the reflector.

The central support structure can keep the central attachment point stationary when the reflector body is in oscillating movement. It can be shown, for many common MEMS reflector system configurations, that the central support structure may increase the spring constant of piston mode oscillation by a factor of approximately ten. The frequency of piston mode oscillation is directly proportional to the square root of the spring constant, so this increase in the spring constant may increase the oscillation frequency of piston mode oscillation by a factor of approximately 3.2. This raises the piston mode frequency above operational oscillation frequencies in most reflector device configurations. Furthermore, the central support structure also reduces the vibration amplitude of piston mode oscillation. The vibration performance of the MEMS reflector system is thereby improved.

Figure 2:
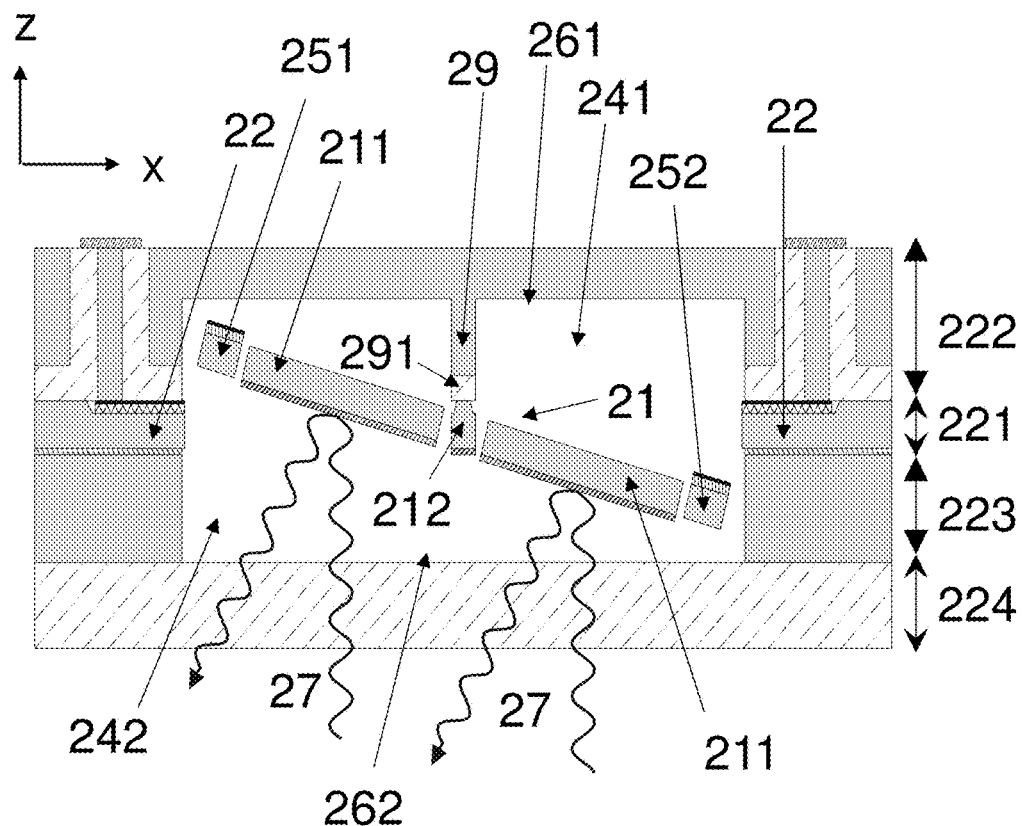
FIG. 2 illustrates a MEMS reflector system according to one embodiment.

FIG. 2 illustrates a scanning microelectromechanical reflector system comprising a device wafer 221. The device wafer may, for example, be a part of a silicon-on-insulator wafer which also includes handle wafer 223, as illustrated in FIG. 2. Alternatively, the device wafer may be a double silicon-on-insulator wafer. The device wafer defines a device plane, which will be labelled the xy-plane in this disclosure.

For the purpose of this disclosure, either the upper or the lower surface of the device wafer 221 in FIG. 2 may define the device plane. The reflector 21 comprises a reflector body 211. The reflector body 211 may have a rest position where its upper or lower surface coincides with the device plane, but it can tilt out of the device plane when actuated, as illustrated in FIG. 2. The device wafer 221 comprises a fixed frame 22 which surrounds the reflector. In this disclosure, the term "fixed" refers to a body which is firmly attached to a much larger body, such as the MEMS reflector system package, and incapable of moving in relation to that large body.

Figure 1A:
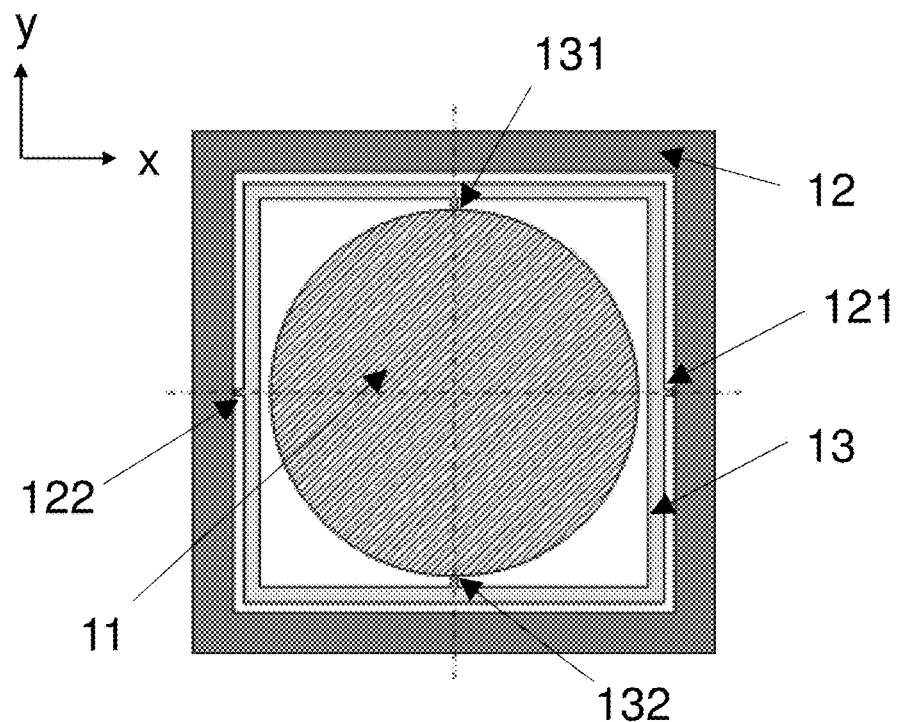
FIG. 1a illustrates a reflector which is suspended within a gimbal frame.
Figure 1B:
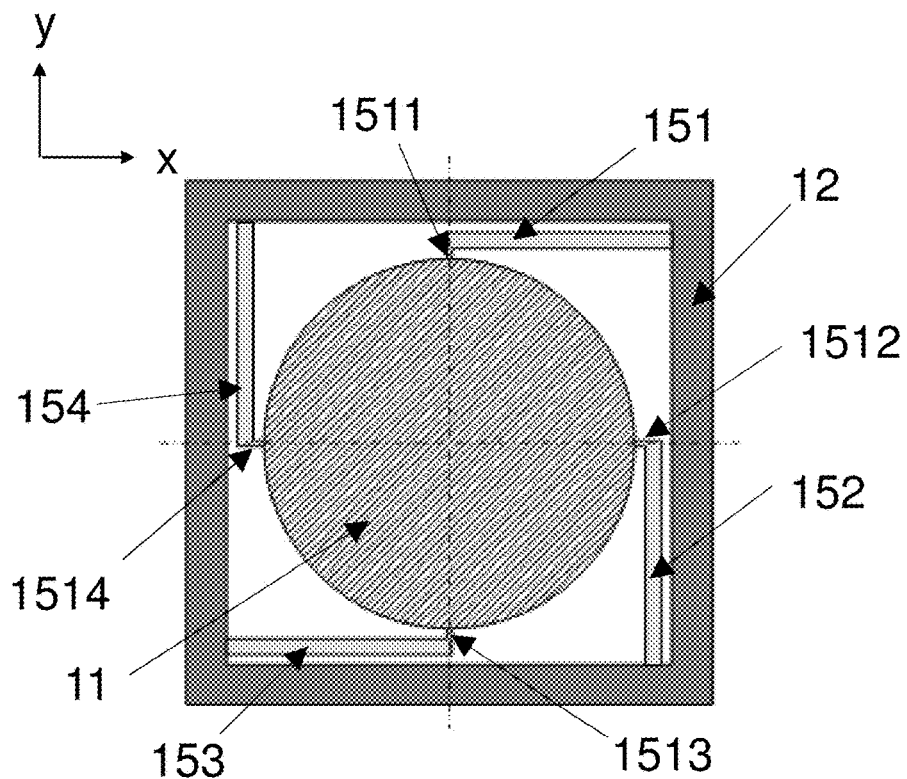
FIG. 1b illustrates a reflector which is suspended from suspension springs.

The scanning microelectromechanical reflector system in FIG. 2 further comprises actuator units 251 and 252 which are configured to tilt the reflector body 211 out of the device plane. The actuation units 251 and 252 may comprise suspenders in a configuration which corresponds to the suspender configuration in FIG. 1b. Each suspender may include a piezoelectric transducer. One end of each suspender may be attached to the fixed frame 22, and the other to the reflector body 211. When an actuation voltage is applied to the piezoelectric transducer, the bending of the suspender may move one edge of the reflector body 211 upward or downward.

In this disclosure, the terms "up" and "down" refer to the z-direction indicated in the Figures. The z-direction, which is perpendicular to the device plane, may also be referred to as the "vertical" direction. Terms such as "top", "bottom", "above" and "below" refer to how elements are ordered along the z-axis. However, these terms do not imply that the same vertical orientations illustrated in the Figures would always be used when the device is manufactured, or when the device is in use. In other words, the device may be oriented in any suitable direction during usage and manufacturing, for example in such a manner that a side which is in this disclosure referred to as the "top" side is oriented downward.

The scanning microelectromechanical reflector system may further comprise a first packaging component 222 on top of the device wafer 221. The first packaging component 222 may comprise a first cavity 241. The first cavity 241 may be vertically aligned with the fixed frame 22, and with the reflector body 211. In FIG. 2, the first cavity 241 is also vertically aligned with a corresponding second cavity 242 in the handle wafer 223. In this disclosure, "vertical alignment" refers to a configuration where the reflector body 211 has sufficient room to tilt out of the device plane without coming into contact with the first cavity wall 261 or with the second cavity wall 262. The first cavity wall 261 provides the upper limit of the first cavity 241, while the second cavity wall 262 provides the lower limit of the second cavity 242. The first cavity 241 thereby extends from the first cavity wall 261 to the device plane, and the second cavity 252 extends from the second cavity wall 262 to the device plane.

In FIG. 2, the first cavity 241 has been formed in the first packaging component 222 and the second cavity 242 has been formed in the handle wafer 223, while a second packaging component 224 provides the second cavity wall. The second cavity 242 gives the reflector body 211 enough room for free movement on the downward tilting edge. The lower side of the reflector body 211 may be coated with a thin-film, for example a titanium-platinum-gold film, which reflects electromagnetic radiation.

The first packaging component may be a glass-silicon capping wafer where a central support structure 29 can be formed in a silicon portion above the reflector body 211. In this disclosure, the central support structure may be a pillar with a cylindrical shape, a rectangular prism shape or any other oblong prism shape. Alternatively, the area of xy-cross-sections in the central support structure may vary as a function of z. For example, the central support structure may have the shape of a cone or a pyramid, with a truncated but narrow apex close to the central attachment point, and a broad base at the cavity wall. Central support structures with other shapes may also be used, as long as they leave enough room for reflector oscillation in the cavity.

The second packaging component 224 may in this case be a glass window or transparent wafer. The second packaging component 224 allows electromagnetic radiation to penetrate the cavities 241 and 242, be reflected by the reflector 21 and then to exit the cavities 241 and 242 again.

The first cavity 241 in the first packaging component may be broader than the fixed frame 22. Its sidewalls, which determine the size of the cavity in the xy-plane, do not necessarily have to be aligned with the sidewalls of the second cavity 242. However, both cavities must be sufficiently high to allow free movement of the reflector body 211 in the cavity.

The reflector 21 also comprises a central attachment point 212. The MEMS reflector system further comprises the central support structure 29 which extends from the cavity wall 261, through the cavity 241, to the central attachment point 212 on the reflector. If the first packaging component is a wafer which comprises regions of silicon and glass, as illustrated in FIG. 2, then the lowest tip of the central support structure 29 may comprise a glass region 291.

Figure 3:
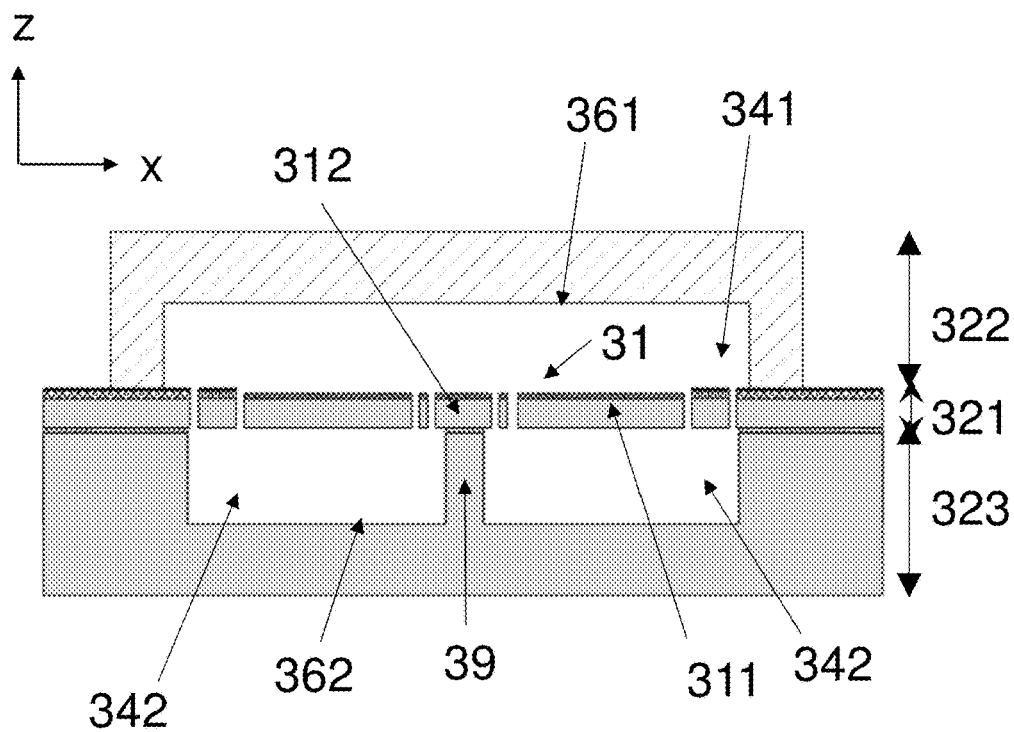
FIG. 3 illustrates a MEMS reflector system according to another embodiment.

FIG. 3 illustrates an alternative configuration where the first packaging component 322 is a cover which is bonded to the device wafer. It forms a transparent window above the device plane and delimits a first cavity 341 above the reflector body 311. A first cavity wall 361 again delimits the first cavity 341 vertically, so that the first cavity 341 extends from the reflector body 311 to the first cavity wall 361. The handle wafer 323, which in this case is a part of the same silicon-on-insulator wafer as the device wafer 321, forms the second packaging component. The silicon-on-insulator wafer is in this case a cavity-SOI wafer where the second cavity 342 has been formed to a given depth. The second cavity wall 362, which delimits the second cavity 342 vertically, lies at this depth in the SOI wafer. The second cavity 342 extends from the reflector body 311 to the second cavity wall 362. The central support structure 39 is in this case formed in the silicon handle wafer 323 when the second cavity 342 is formed. The central support structure 39 is thereby already attached to the central attachment point 312 when the device wafer is processed. In other words, since the reflector and the central support structure are all processed into the SOI-wafer, the central attachment point can in this case either be considered a part of the reflector or a part of the central support structure. For reasons of consistency and clarity, this disclosure only refers to the central attachment point as a part of the reflector.

In the configuration illustrated in FIG. 3, electromagnetic radiation penetrates the cavities 341 and 342 through the first packaging component 322, and then it can be reflected by the reflector 31 and exit the cavities 341 and 342 again. In other words, the reflective thin-film is in this case prepared on the top surface of the reflector 31.

The sidewalls of the first cavity 341, which determine the size of the cavity in the xy-plane, may not be exactly aligned with the sidewalls of the second cavity 342. The first and second cavities 341 and 342 must give the reflector body 311 sufficient room to oscillate to its full amplitude, but aside from this minimum the requirement, the dimensions of the cavities can be chosen freely.

Figure 4:
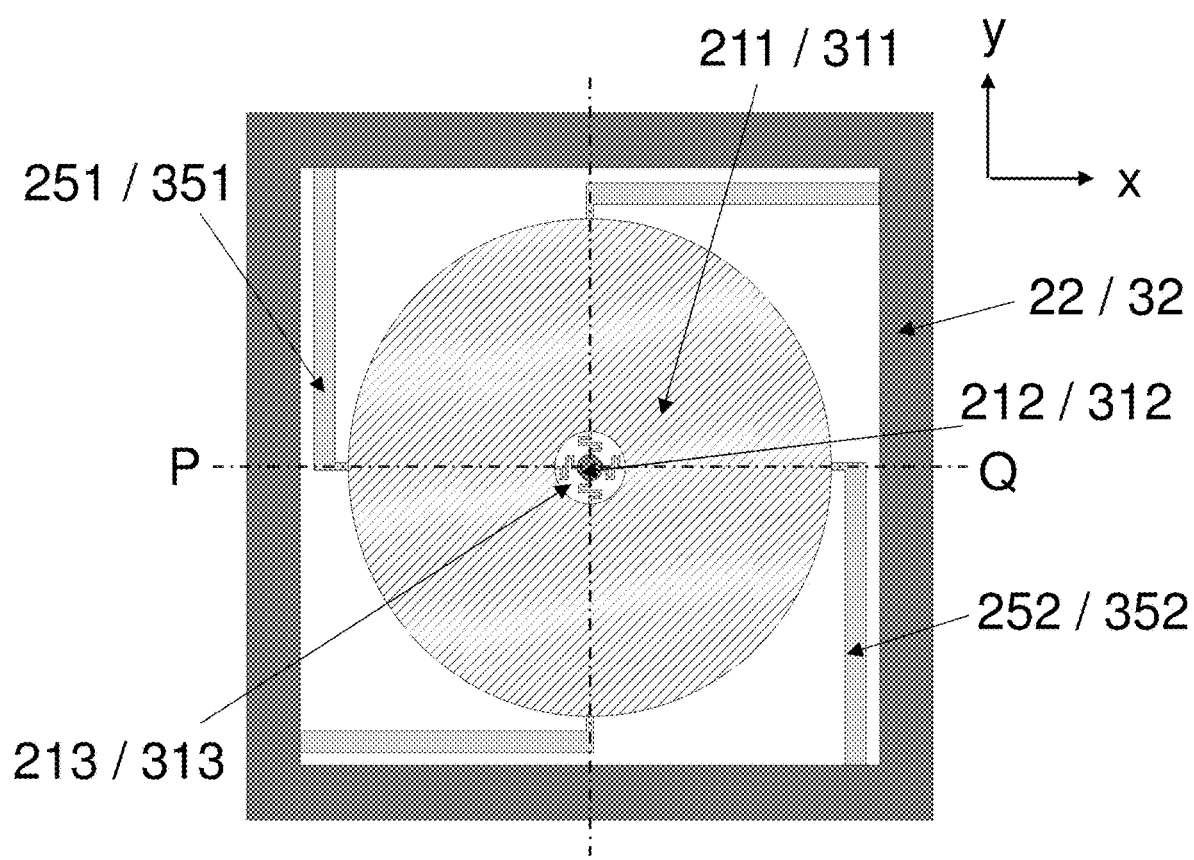
FIG. 4 illustrates a MEMS reflector system in the device plane.

FIG. 4 illustrates the scanning microelectromechanical reflector systems of FIGS. 2 and 3 in the device plane, i.e. in the xy-plane, in a position where the reflector body 211/311 lies entirely in the xy-plane. The cross-sections illustrated in FIGS. 2 and 3 correspond to the cross-sections from point P to point Q in FIG. 4. The central attachment point 212/312 lies within a central opening 213/313 in the reflector body 211/311. The central attachment point 212/312 is attached with meandering flexures to the sidewalls of the central opening 213/313. Flexures will be discussed in more detail in the following flexure embodiments.

First Flexure Embodiment

Figure 5:
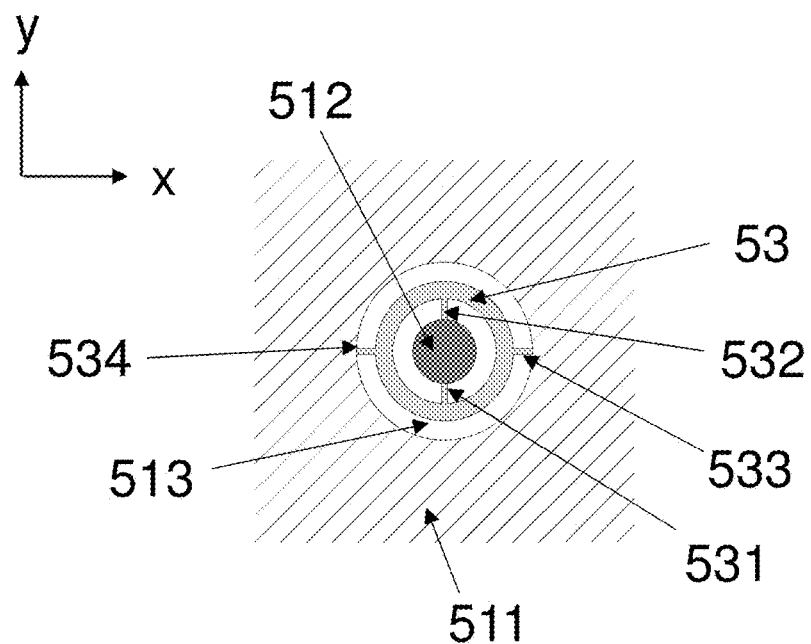
FIG. 5 illustrates a first flexure embodiment.

FIG. 5 illustrates a central portion of a reflector body in a MEMS reflector system according to this disclosure. The central attachment point 512 is attached with flexures to the sidewall of the central opening 513 in the reflector body 511.

In the illustrated embodiment, the flexures comprise a gimbal frame 53 which surrounds the central attachment point 512. The flexures further comprise first and second torsion beams 531 and 532 which extend in opposite directions on a first axis from the central attachment point 512 to the gimbal frame 53, and third and fourth torsion beams 533 and 534 which extend in opposite directions on a second axis, perpendicular to the first axis, from the gimbal frame 53 to the sidewalls of the central opening 513 in the reflector body 511.

In FIG. 5, the first axis is parallel to the y-axis and the second axis is parallel to the x-axis. When the reflector body 511 is in motion, all oscillation components which involve rotation about the x-axis will twist third and fourth torsion beams 533 and 534, while all oscillation components which involve rotation about the y-axis will twist first and second torsion beams 531 and 532. The forces and moments exerted by the oscillating reflector body in the direction of the central attachment point 512 is thereby attenuated in the torsion beams 531-534, and partly also in the flexible gimbal frame 53. This allows the central attachment point 512 to remain stationary and level in the xy-plane even when the reflector body 511 is in oscillating motion.

Torsion beams 531-532 and 533-534 should be sufficiently thick in the z-direction to stiffen piston-mode oscillation to resonance frequencies higher than the operational resonance frequencies, but also sufficiently thin to facilitate torsional twisting. The torsion beams can be as thick as the reflector body, or thinner than the reflector body, as explained in more detail in subsequent method embodiments.

Second Flexure Embodiment

Figure 6:
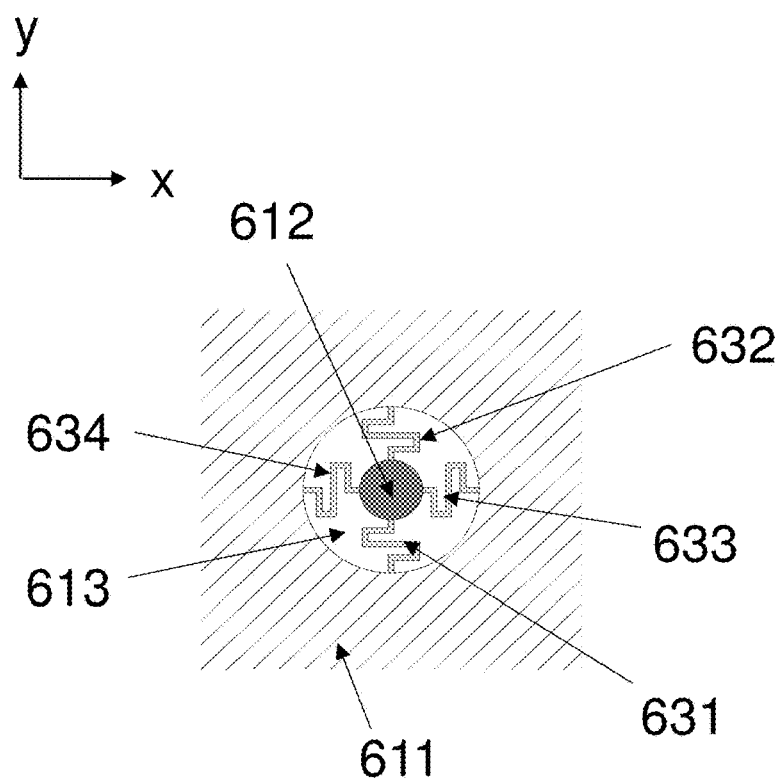
FIG. 6 illustrates a second flexure embodiment.

FIG. 6 illustrates a central portion of a reflector body in a MEMS reflector system according to this disclosure. The central attachment point 612 is attached with flexures to the sidewall of the central opening 613 in the reflector body 611. In the illustrated embodiment, the flexures comprise first and second meandering flexures 631 and 632 which extend in opposite directions along a first axis from the central attachment point 612 to the sidewalls of the central opening 613 in the reflector body 611, and third and fourth meandering flexures 633 and 634 which extend in opposite directions along a second axis, perpendicular to the first axis, from the central attachment point 612 to the sidewalls of the central opening 613 in the reflector body 611.

In FIG. 6, the first axis is parallel to the y-axis and the second axis is parallel to the x-axis. When the reflector body 611 is in motion, all oscillation components which involve rotation about the x-axis will twist third and fourth torsion meandering flexures 633 and 634, while all oscillation components which involve rotation about the y-axis will twist first and second meandering flexures 631 and 632. The forces and moments exerted by the oscillating reflector body in the direction of the central attachment point 512 will thereby attenuated in the meandering flexures 631-634, which allows the central attachment point 612 to remain stationary and level in the xy-plane even when the reflector body 611 is in oscillating motion.

The number of meandering flexures may alternatively be two, three, five, or any other larger number. The number of meandering flexures may be optimized based on the number and placement of the actuator units, or based on symmetry considerations and the intended oscillation modes of the reflector. The flexures may be placed symmetrically around the central attachment point.

As in the previous flexure embodiment, the meandering flexures 631-632 and 633-634 should be sufficiently thick in the z-direction to stiffen piston-mode oscillation to resonance frequencies higher than the operational resonance frequencies. The meandering flexures should also be sufficiently thin, and the meanders sufficiently wide, to facilitate the twisting flexibility needed for attenuating the motion of the reflector body. The meandering flexures can be as thick as the reflector body, or thinner than the reflector body, as explained in more detail in subsequent method embodiments.

In other words, the central opening (513, 613) may extend through the reflector (511, 611), and the vertical thickness of the central attachment point (512, 612) and the flexures (53, 531-534, 631-634) may be equal to the vertical thickness of the reflector body (511, 611).

Alternatively, the central opening (513, 613) may extend to a first depth in the reflector (511, 611), and the vertical thickness of the central attachment point (512, 612) and the flexures (53, 531-534, 631-634) may be less than the vertical thickness of the reflector body (511, 611).

Manufacturing Methods

This disclosure also describes a method for manufacturing a scanning microelectromechanical reflector system. The method comprises the steps of preparing a device wafer which comprises a fixed frame and a reflector, and preparing in the reflector a reflector body and a central attachment point located within a central opening in the reflector body. The method further comprises the steps of preparing one or more actuator units in the device wafer, whereby the actuator units are configured to tilt the reflector body out of the device plane, and preparing one or more flexures which extend from the sidewalls of the central opening in the reflector body to the central attachment point, wherein the flexures are configured to allow the central attachment point to remain stationary in the device plane when the actuation units tilt the reflector body out of the device plane. The method further comprises the steps of preparing a first packaging component on top of the device wafer, wherein the first packaging component comprises a first cavity wall which delimits a first cavity in a vertical direction, and preparing a central support structure in the first cavity wall, so that the central support structure extends into the first cavity, and bonding the first packaging component to the device wafer, so that the central support structure is bonded to the central attachment point.

As described in the first flexure embodiment, the prepared flexures may comprise a gimbal frame which surrounds the central attachment point, first and second torsion beams which extend in opposite directions on a first axis from the central attachment point to the gimbal frame, and third and fourth torsion beams which extend in opposite directions on a second axis, perpendicular to the first axis, from the gimbal frame to the sidewalls of the central opening in the reflector body.

As described in the second flexure embodiment, the prepared flexures may comprise first and second meandering flexures which extend in opposite directions along a first axis from the central attachment point to the sidewalls of the central opening in the reflector body, and third and fourth meandering flexures which extend in opposite directions along a second axis, perpendicular to the first axis, from the central attachment point to the sidewalls of the central opening in the reflector body.

First Etching Embodiment

A MEMS reflector system where the central opening (513, 613) extends through the reflector (511, 611), and where the vertical thickness of the central attachment point (512, 612) and the flexures (53, 531-534, 631-634) is equal to the vertical thickness of the reflector body (511, 611), may be prepared in a method where the step of preparing the reflector in the device wafer comprises etching the central opening (513, 613), the central attachment point (512, 612) and the flexures (53, 531-534, 631-634) in a deep reactive ion etch (DRIE) process which extends through the device wafer, so that the vertical thickness of the central attachment point (512, 612) and the flexures (53, 531-534, 631-634) becomes equal to the vertical thickness of the reflector body (511, 611).

The device wafer on which the method according to this first etching embodiment is performed may, for example, be a silicon-on-insulator device wafer.

Second Etching Embodiment

A MEMS reflector system where the central opening (513, 613) extends to a first depth in the reflector (511, 611), and where the vertical thickness of the central attachment point (512, 612) and the flexures (53, 531-534, 631-634) is less than the vertical thickness of the reflector body (511, 611), may be prepared in a method where the step of preparing the reflector in the device wafer comprises etching the central opening (513, 613), the central attachment point (512, 612) and the flexures (53, 531-534, 631-634) with a combination of anisotropic and isotropic etching processes, so that the vertical thickness of the central attachment point (512, 612) and the flexures (53, 531-534, 631-634 becomes less than the vertical thickness of the reflector body (511, 611).

The combination of anisotropic and isotropic etching processes may, for example, be a single-crystal reactive etching and metallization (SCREAM) process. The SCREAM etching process may comprise a first anisotropic etching step through a mask which defines the horizontal dimensions of the central attachment point, the flexures, and the sidewalls of the central opening. This anisotropic etching step produces a set of trenches extending to a first depth in the device wafer. This first depth may be equal to the desired vertical height of the central attachment point and the flexures. The sidewalls and the floors of these trenches may then be coated with an oxide, after which the oxide may be removed from the trench floors. A second anisotropic etching step may then be performed to etch the trenches down to a second depth, deeper than the first depth. An isotropic etch may then be performed for a sufficiently long period to release the flexures and the central attachment point from the bulk substrate. The oxide deposited after the first anisotropic etching step protects the sidewalls of both the central opening, the flexures and the central attachment point during the isotropic etchings step.

The method according to this second etching embodiment may be performed on a silicon-on-insulator device wafer. Alternatively, it may be performed on a double silicon-on-insulator device wafer in the manner which is schematically illustrated in FIGS. 7a-7e. The device wafer 713 comprises a first silicon layer 711 on top of a first insulating layer 713. The first insulating layer 713 lies on top of a second silicon layer 712, and the second silicon layer 712 lies on top of a second insulating layer 714. The insulating layers 713 and 714 may be silicon oxide layers. The entire device wafer 713 may lie on top of a larger handle wafer, as illustrated in FIG. 2.

Figure 7A:
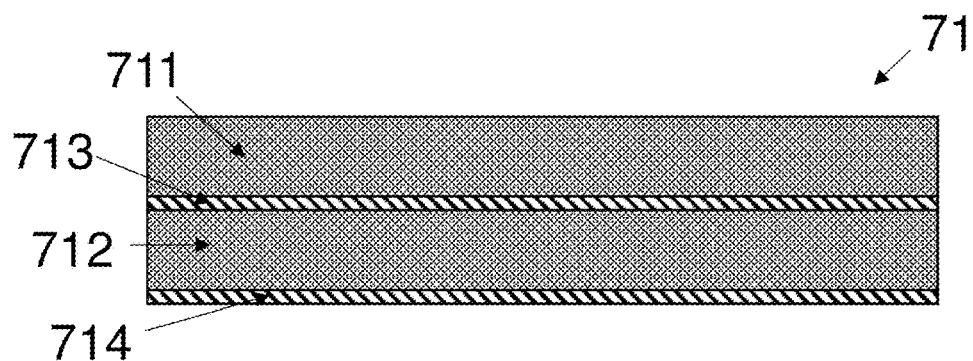
FIGS. 7a-7e illustrates a method for performing a second etching embodiment on a double silicon-on-insulator device wafer.
Figure 7B:
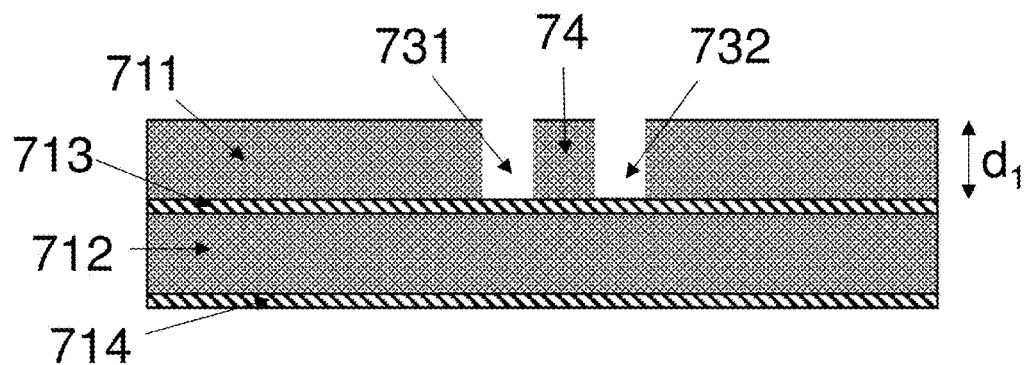
Figure 7C:
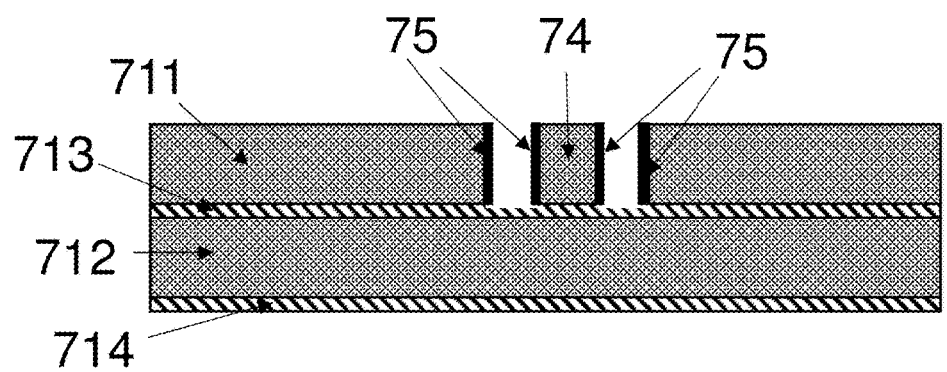

In FIG. 7b, two trenches 731 and 732 have been etched in the first anisotropic etching step. Together they define the sidewalls of the central opening and of the structure 74, which may comprise flexures and/or the central attachment point. The first anisotropic etching step may be stopped at first insulating layer 713, so that the first depth $d_1$ becomes equal to the thickness of the first silicon layer 711. In FIG. 7c, the trenches have been coated with an oxide layer 75, and then the oxide has been removed from the trench floors.

Figure 7D:
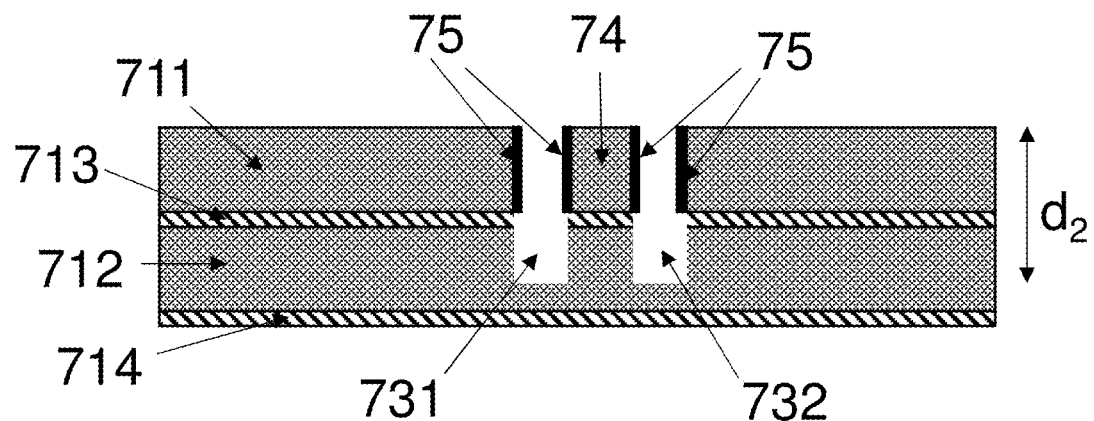
Figure 7E:
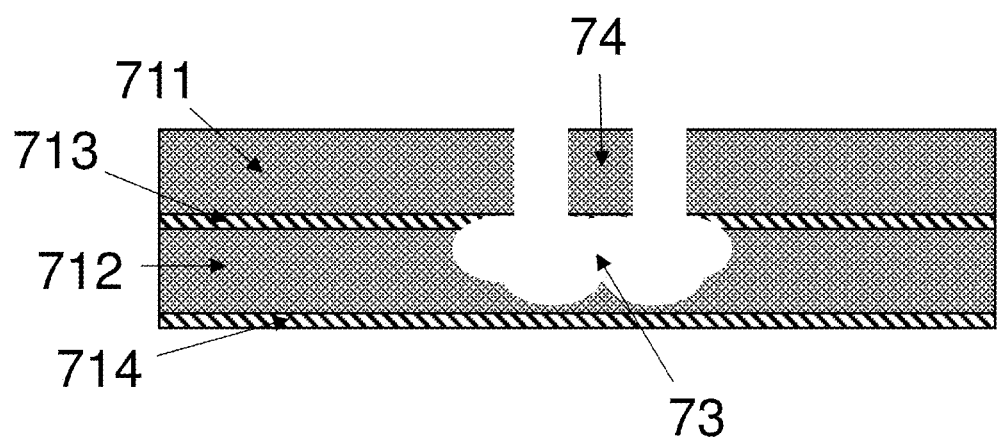

In FIG. 7d, a second anisotropic etching step has been performed to etch the trenches 731 and 732 down to a second depth $d_2$. In FIG. 7e, an isotropic etch has been performed to join the two trenches 731 and 732 into one cavity 73, and to thereby release the structure 74 from the bulk substrate. The oxide 75 may be removed after the isotropic etching step. The central attachment point and the flexures must be released from the bulk substrate in this way if the central attachment point is to remain stationary without hindering the oscillation of the reflector body.

MEMS Reflector System Manufacturing

Figure 8:
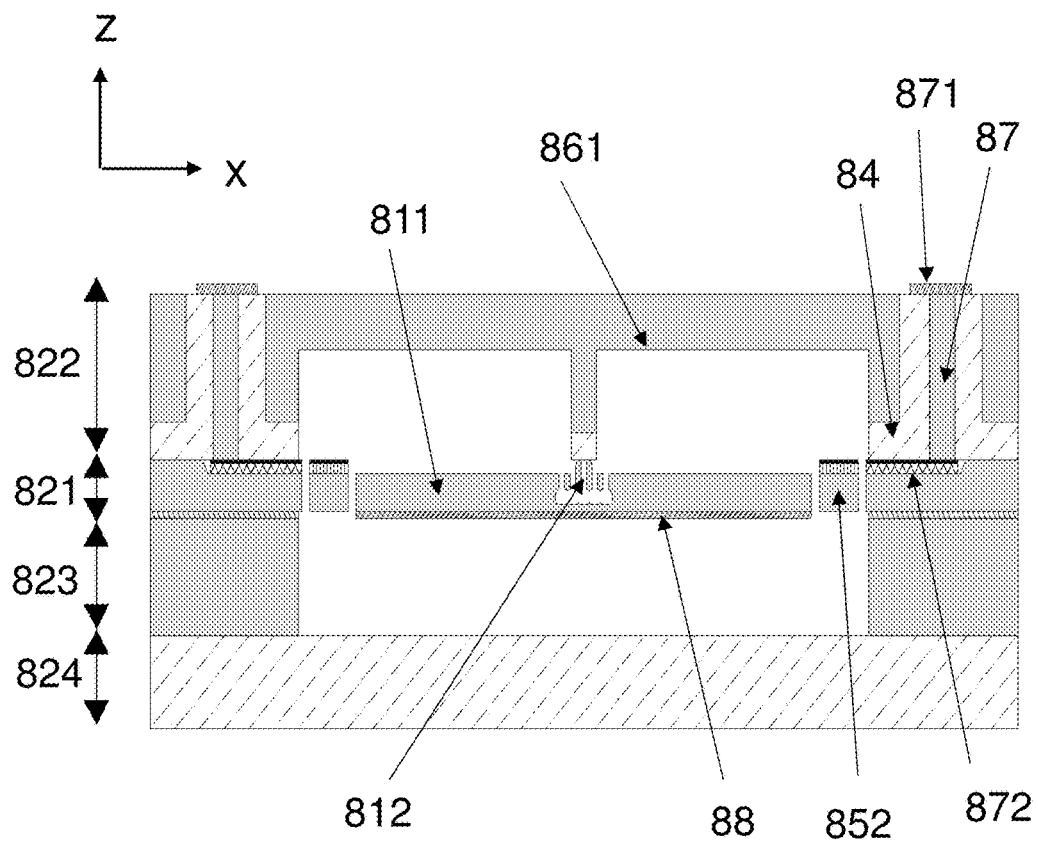
FIG. 8 illustrates a manufacturing method.

FIG. 8 illustrates an exemplary scanning MEMS reflector system where the central opening in the reflector body 811 extends partway through the reflector, but not all the way through. Reference numbers 821-824 and 86 correspond to reference numbers 221-224 and 26 in FIG. 2, respectively. The reflecting area on the bottom surface of the reflector body 811 comprises a reflective coating 88, which may for example be a titanium-platinum-gold thin-film. This reflecting area is slightly larger in the reflector system illustrated in FIG. 8 than in the reflector system illustrated in FIG. 2, where the central opening extends all the way through the reflector.

The first packaging component may comprise insulating areas, such as 84, made of glass, and semiconducting areas, such as the first cavity wall 861, made of silicon. Silicon vias 87 may extend through the first packaging component 822, from a top contact 871 to a bottom contact 872 and to suspenders 852.

The first packaging component 822 may be bonded to the device wafer 821 for example in an anodic bonding process where the first cavity wall 861 may be utilized as a bonding electrode. The glass wafer 824 may also be bonded to handle wafer 823 in an anodic bonding process. Alternatively, fusion bonding or metal bonding may be used to bond the wafers to each other.

Figure 9:
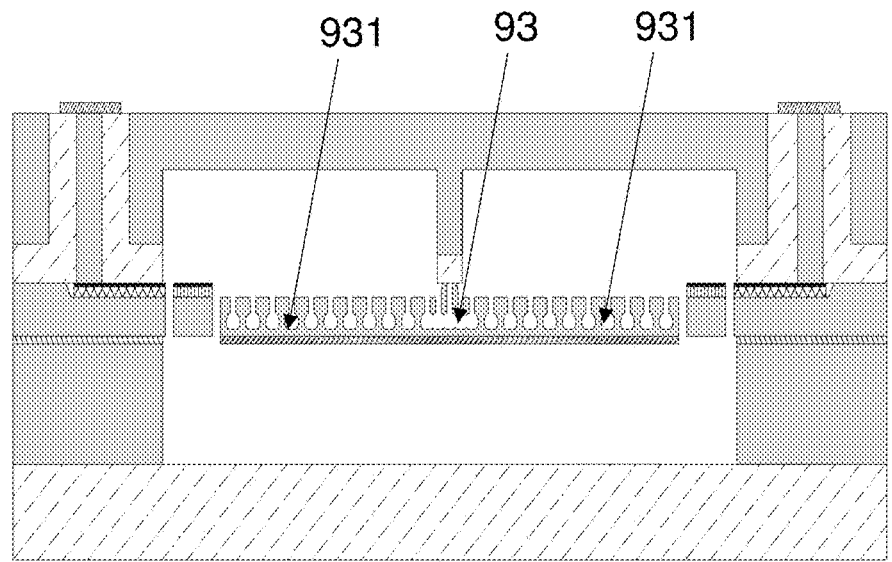
FIG. 9 illustrates a manufacturing method.

It can be advantageous in some scanning MEMS reflector systems to reduce dynamic deformation in the reflector body by reducing its mass. Mass reduction can be readily implemented in conjunction with the manufacturing process described in the second etching embodiment above, where a combination of anisotropic and isotropic etching processes was used. As illustrated in FIG. 9, with suitably patterned etching masks, a SCREAM etching process where the central opening 93 is etched can simultaneously be used for etching one or more mass reduction cavities 931 in the reflector body. In other words, one or more mass reduction cavities may be etched in the reflector body in the same SCREAM process where the central opening, the central attachment point and the flexures are etched. The sole purpose of these mass reduction cavities 931 is to reduce dynamic deformation in the reflector body when it oscillates.

The invention claimed is:

1. A scanning microelectromechanical reflector system comprising:
    a device wafer which defines a device plane, wherein the device wafer comprises a reflector which comprises a reflector body, and the device wafer further comprises a fixed frame which surrounds the reflector body, wherein the reflector is suspended from the fixed frame by one or more actuator units which are attached at one end to the fixed frame and attached at another end to the reflector body, and are configured to tilt the reflector body out of the device plane,
    a first cavity vertically aligned with the reflector body above the device plane and a second cavity vertically aligned with the reflector body below the device plane,
    a first packaging component on top of the device wafer, wherein the first packaging component comprises a first cavity wall which delimits the first cavity in the vertical direction, and
    a second packaging component below the device wafer, wherein the second packaging component comprises a second cavity wall which delimits the second cavity in the vertical direction,
    wherein
    the reflector also comprises a central attachment point, and that the central attachment point is located within a central opening in the reflector body, and that one or more flexures extend from the sidewalls of the central opening to the central attachment point,
    the flexures are configured to allow the central attachment point to remain stationary in the device plane when the one or more actuator units tilt the reflector body out of the device plane, and wherein
    at least one of the first and second cavity walls further comprises a central support structure which extends through the corresponding cavity from the cavity wall to the central attachment point of the reflector.

2. The scanning microelectromechanical reflector system according to claim 1, wherein the flexures comprise a gimbal frame which surrounds the central attachment point, and that the flexures further comprise first and second torsion beams which extend in opposite directions on a first axis from the central attachment point to the gimbal frame, and third and fourth torsion beams which extend in opposite directions on a second axis, perpendicular to the first axis, from the gimbal frame to the sidewalls of the central opening in the reflector body.

3. The scanning microelectromechanical reflector system according to claim 1, wherein the flexures comprise first and second meandering flexures which extend in opposite directions along a first axis from the central attachment point to the sidewalls of the central opening in the reflector body, and third and fourth meandering flexures which extend in opposite directions along a second axis, perpendicular to the first axis, from the central attachment point to the sidewalls of the central opening in the reflector body.

4. The scanning microelectromechanical reflector system according to claim 1, wherein the central opening extends through the reflector and the vertical thickness of the central attachment point and the flexures is equal to the vertical thickness of the reflector body.

5. The scanning microelectromechanical reflector system according to claim 1, wherein the central opening extends to a first depth in the reflector, and the vertical thickness of the central attachment point and the flexures is less than the vertical thickness of the reflector body.

6. The scanning microelectromechanical reflector system according to claim 5, wherein the device wafer is a double-silicon-on-insulator wafer.

7. A method for manufacturing a scanning microelectromechanical reflector system, the method comprising:
    preparing a device wafer which comprises a fixed frame and a reflector,
    preparing in the reflector a reflector body and a central attachment point located within a central opening in the reflector body,
    preparing one or more actuator units in the device wafer, whereby the reflector body is suspended from the fixed frame by the one or more actuator units, whereby the actuator units are attached at one end to the fixed frame and attached at another end to the reflector body, and whereby the actuator units are configured to tilt the reflector body out of the device plane, preparing one or more flexures which extend from the sidewalls of the central opening in the reflector body to the central attachment point, wherein the flexures are configured to allow the central attachment point to remain stationary in the device plane when the actuation units tilt the reflector body out of the device plane, preparing a first packaging component on top of the device wafer, wherein the first packaging component comprises a first cavity wall which delimits a first cavity in a vertical direction, preparing a central support structure in the first cavity wall, so that the central support structure extends into the first cavity, and bonding the first packaging component to the device wafer so that the central support structure is bonded to the central attachment point.

8. The method according to claim 7, wherein the prepared flexures comprise a gimbal frame which surrounds the central attachment point, first and second torsion beams which extend in opposite directions on a first axis from the central attachment point to the gimbal frame, and third and fourth torsion beams which extend in opposite directions on a second axis, perpendicular to the first axis, from the gimbal frame to the sidewalls of the central opening in the reflector body.

9. The method according to claim 7, wherein the prepared flexures comprise first and second meandering flexures which extend in opposite directions along a first axis from the central attachment point to the sidewalls of the central opening in the reflector body, and third and fourth meandering flexures which extend in opposite directions along a second axis, perpendicular to the first axis, from the central attachment point to the sidewalls of the central opening in the reflector body.

10. The method according to claim 7, wherein the step of preparing the reflector in the device wafer comprises etching the central opening, the central attachment point and the flexures in a deep reactive ion etch (DRIE) process which extends through the device wafer, so that the vertical thickness of the central attachment point and the flexures becomes equal to the vertical thickness of the reflector body.

11. The method according to claim 7, wherein the step of preparing the reflector in the device wafer comprises etching the central opening, the central attachment point and the flexures with a combination of anisotropic and isotropic etching processes, so that the vertical thickness of the central attachment point and the flexures becomes less than the vertical thickness of the reflector body.

12. The method according to claim 11, wherein the device wafer is a double-silicon-on-insulator wafer.

13. The method according to claim 11, wherein one or more mass reduction cavities are etched in the reflector body in the same processes where the central opening, the central attachment point and the flexures are etched.

14. A scanning microelectromechanical reflector system comprising:

a device wafer which defines a device plane, wherein the device wafer comprises a reflector which comprises a reflector body, and the device wafer further comprises a fixed frame which surrounds the reflector body, and one or more actuator units configured to tilt the reflector body out of the device plane, a first cavity vertically aligned with the reflector body above the device plane and a second cavity vertically aligned with the reflector body below the device plane, a first packaging component on top of the device wafer, wherein the first packaging component comprises a first cavity wall which delimits the first cavity in the vertical direction, and a second packaging component below the device wafer, wherein the second packaging component comprises a second cavity wall which delimits the second cavity in the vertical direction, wherein the reflector also comprises a central attachment point, and that the central attachment point is located within a central opening in the reflector body, and that one or more flexures extend from the sidewalls of the central opening to the central attachment point, the flexures are configured to allow the central attachment point to remain stationary in the device plane when the one or more actuator units tilt the reflector body out of the device plane, at least one of the first and second cavity walls further comprises a central support structure which extends through the corresponding cavity from the cavity wall to the central attachment point of the reflector, and at least one of the central opening extends through the reflector, and the vertical thickness of the central attachment point and the flexures is equal to the vertical thickness of the reflector body, and the central opening extends to a first depth in the reflector, and the vertical thickness of the central attachment point and the flexures is less than the vertical thickness of the reflector body.

* * * * *